US008196137B2

(12) United States Patent
Baker, III et al.

(10) Patent No.: US 8,196,137 B2
(45) Date of Patent: Jun. 5, 2012

(54) REMOTE AUTO PROVISIONING AND PUBLICATION OF APPLICATIONS

(75) Inventors: James H Baker, III, Sammamish, WA (US); Huei Chung Wang, Kirkland, WA (US); Ara Bernardi, Mercer Island, WA (US); Tad Dennis Brockway, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1247 days.

(21) Appl. No.: 11/872,428

(22) Filed: Oct. 15, 2007

(65) Prior Publication Data

US 2009/0100448 A1    Apr. 16, 2009

(51) Int. Cl.
*G06F 9/455* (2006.01)
*G06F 15/177* (2006.01)
*G06F 15/445* (2006.01)
(52) U.S. Cl. ............................ 718/1; 709/220; 717/174
(58) Field of Classification Search .................. None
See application file for complete search history.

(56) References Cited

U.S. PATENT DOCUMENTS

| 6,362,836 | B1 | 3/2002 | Shaw et al. |
| 6,654,784 | B1 | 11/2003 | Wei |
| 7,577,722 | B1* | 8/2009 | Khandekar et al. ........... 709/220 |
| 7,987,432 | B1* | 7/2011 | Grechishkin et al. ......... 715/778 |
| 2001/0047406 | A1 | 11/2001 | Araujo et al. |
| 2002/0032763 | A1 | 3/2002 | Cox et al. |
| 2003/0063119 | A1 | 4/2003 | Bloomfield et al. |
| 2003/0153338 | A1* | 8/2003 | Herz et al. .................... 455/517 |
| 2004/0139309 | A1* | 7/2004 | Gentil et al. ...................... 713/1 |
| 2004/0261086 | A1 | 12/2004 | Jensen et al. |
| 2005/0193382 | A1 | 9/2005 | Goring et al. |
| 2006/0123040 | A1 | 6/2006 | McCarthy et al. |
| 2006/0136914 | A1 | 6/2006 | Marascio et al. |
| 2006/0165227 | A1 | 7/2006 | Steeb et al. |
| 2006/0217111 | A1 | 9/2006 | Marolia et al. |
| 2007/0061428 | A1 | 3/2007 | Haley et al. |
| 2007/0240145 | A1 | 10/2007 | Saroj et al. |

OTHER PUBLICATIONS

Chinese Office Action mailed Jan. 4, 2012 for Chinese patent application No. 200880112322.8, a counterpart foreign application of U.S. Appl. No. 11/872,428, 11 pages.

* cited by examiner

*Primary Examiner* — Kenneth Tang
(74) *Attorney, Agent, or Firm* — Lee & Hayes, PLLC

(57) ABSTRACT

Techniques for auto provisioning and publication of applications are described. The auto provisioning process enables automatic installation of applications having their respective file packages pre-stored in the server. Subsequently, publication of these applications is conducted automatically. By employing such an automatic process, the latency involved in provisioning and publication of remote applications is reduced, thereby making the process more efficient.

20 Claims, 6 Drawing Sheets

REMOTE AUTO PROVISIONING AND PUBLICATION OF APPLICATIONS

BACKGROUND

Remote computing systems, such as Terminal Services™ by the Microsoft® Corporation, enable multiple users to access remote applications hosted on a server computer. Services that are provided may also include various authentication systems that prevent unauthorized users from accessing the applications.

In such a remote computing system environment, a system administrator may load applications onto a server computer. Thereafter, as a part of defining various policies and governing security, the system administrator may set policies for one or more users. Such policies may allow or restrict the number of applications or type of operations that the users may perform at the server computer. For example, the system administrator may restrict the availability of a particular application to a certain group of users. Subsequently, the system administrator may also publish the list of applications accessible to the users on a web page, based on the policies. The users can then access the relevant applications directly from the webpage onto which they are published.

Upon completion of provisioning process, the system administrator can set policies related to accessing the applications for one or more users. The policies may include, for example, assigning read/write rights to certain user for some applications. The system administrator can publish the list of the applications for each user through one or more web pages. The web pages act as user interfaces for users and include application icons through which the users can access the applications. The process of loading the applications in the server and subsequently publishing these applications for use by the users are time consuming and tedious. Therefore, there remains a need to improve the way the applications are stored in the server computer and published for use by the users.

SUMMARY

This summary is provided to introduce concepts relating to remote auto provisioning and publication of applications. These concepts are further described below in the detailed description. The presented summary is not intended to identify essential features of the claimed subject matter, nor is it intended for use in determining the scope of the claimed subject matter.

In an implementation, application packages in a folder or file system are identified or discovered, coordination is performed with an application runtime component or virtualization coordinator, and a remote application provisioning component or provisioning module makes the application available to user.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

This disclosure is directed to techniques for implementing remote auto provisioning and publication of applications in a remote computing environment, such as Terminal Services™ by the Microsoft® Corporation. In particular, the disclosure is directed to providing, in a remote computing environment, faster provisioning and publication of remote applications to users. The techniques herein address this challenge by providing an auto provisioning and publication of applications hosted on the remote or terminal server computer. The auto provisioning process enables automatic installation of applications. The applications can have their respective file packages stored in the server. Subsequently, publication of these applications is performed automatically. This reduces the latency involved in provisioning and publication of remote applications, thereby making the process more efficient.

The techniques described herein may be used in many different operating environments and systems. Multiple and varied implementations are described below. An exemplary environment that is suitable for practicing various implementations is discussed in the following.

Exemplary systems and methodologies for implementing remote auto provisioning and publication of applications in a remote computing environment are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing contexts, acts and operations described hereinafter is implemented in hardware or other forms of computing platforms.

An Exemplary Network Architecture

Figure 1:
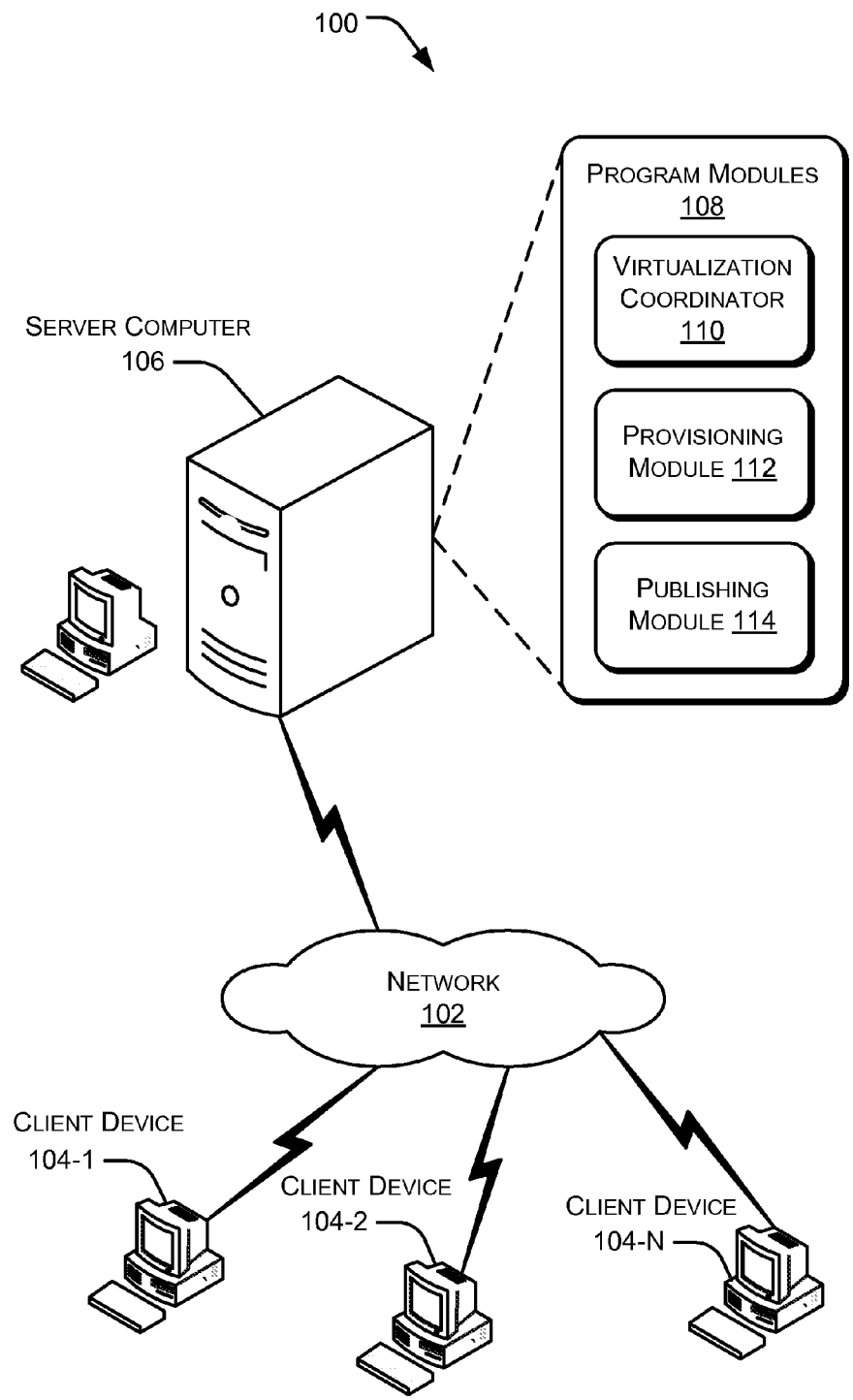
FIG. 1 is a block diagram illustrating an exemplary network architecture for remote auto provisioning and publication of applications.

FIG. 1 shows an exemplary network architecture 100 for implementing remote auto provisioning and publication of applications. To this end, the network architecture 100 includes a network 102 through which any number of client devices 104-1, 104-2, . . . , 104-N (collectively referred to as client devices 104) communicate with a remote server or server computer 106. For example, the network architecture 100 can include a server computer 106, interacting with numerous personal computers (PCs), web servers, and other computing devices spread throughout the world. Alternatively, in another possible implementation, the network architecture 100 can include a limited number of PCs communicating with a single server through a local area network (LAN) or wide area network (WAN) or any other networks. In yet another implementation, the network architecture 100 can include one or more client devices 104 connected directly to the server computer 106.

The network 102 can include a local area network (LAN), wide area network, wireless network, optical network, metropolitan area network (MAN), etc. The client devices 104 can include a general-purpose computing device, a laptop, a mobile computing device, and so on.

The server computer 106 may host several remote applications accessible by the client devices 104. An information technology (IT) or system administrator can copy a collection of files associated with an application and store the copied files at a predefined location in the server 106. For example, the predefined location can be a folder, a file system, and so on. As an example, the collection of files may be necessary for the proper installation of the respective application. Examples of such collection of files include, but are not limited to, application bits, configuration files, and so on. The collection of files may be obtained from an external source such as a compact disc, floppy disc, other computing devices, and so on. In an implementation, the collection of files may be stored in a predefined location located in an external storage device connected to the server computer 106 over the network 102.

Server computer 106 may implement remote auto provisioning and publication of applications through program modules 108. The program modules 108 may include a virtualization coordinator 110, a provisioning module 112, and a publishing module 114. The virtualization coordinator 110 identifies the presence of any collection of files associated with any application by frequently monitoring the predefined location. In an implementation, upon identifying the collection of files, the virtualization coordinator 110 copies the collection of files into the server computer 106 for installing an application. The provisioning module 112 gathers the collection of files and installs the application onto the server computer 106 based on the configuration files present in the collection of files.

In an implementation, the virtualization coordinator 110 may identify the presence of the collection of files and instruct the provisioning module 112 to directly collect the collection of files from the predefined location for installation of the application.

The virtualization coordinator 110 can also construct the necessary data based on which the application can be published. For example, the data may include application icons, application paths, application names, remote desktop protocol (RDP) files, and so on. In an implementation, once the data is constructed, the virtualization coordinator 110 may instruct the publishing module 114 to publish the application on a web page for access by users through client devices 104. The publishing module 114 publishes the application in the web page based on the data received from the virtualization coordinator 110. In an implementation, the application may be published in an existing web page that may include applications previously included by the system administrator. The web page may be a user interface that may present the application using a specific application icon to the user. Such a web page may be displayed to the user upon receiving a request at the server 106 from one or more of the client devices 104.

Exemplary Server Implementation

Figure 2:
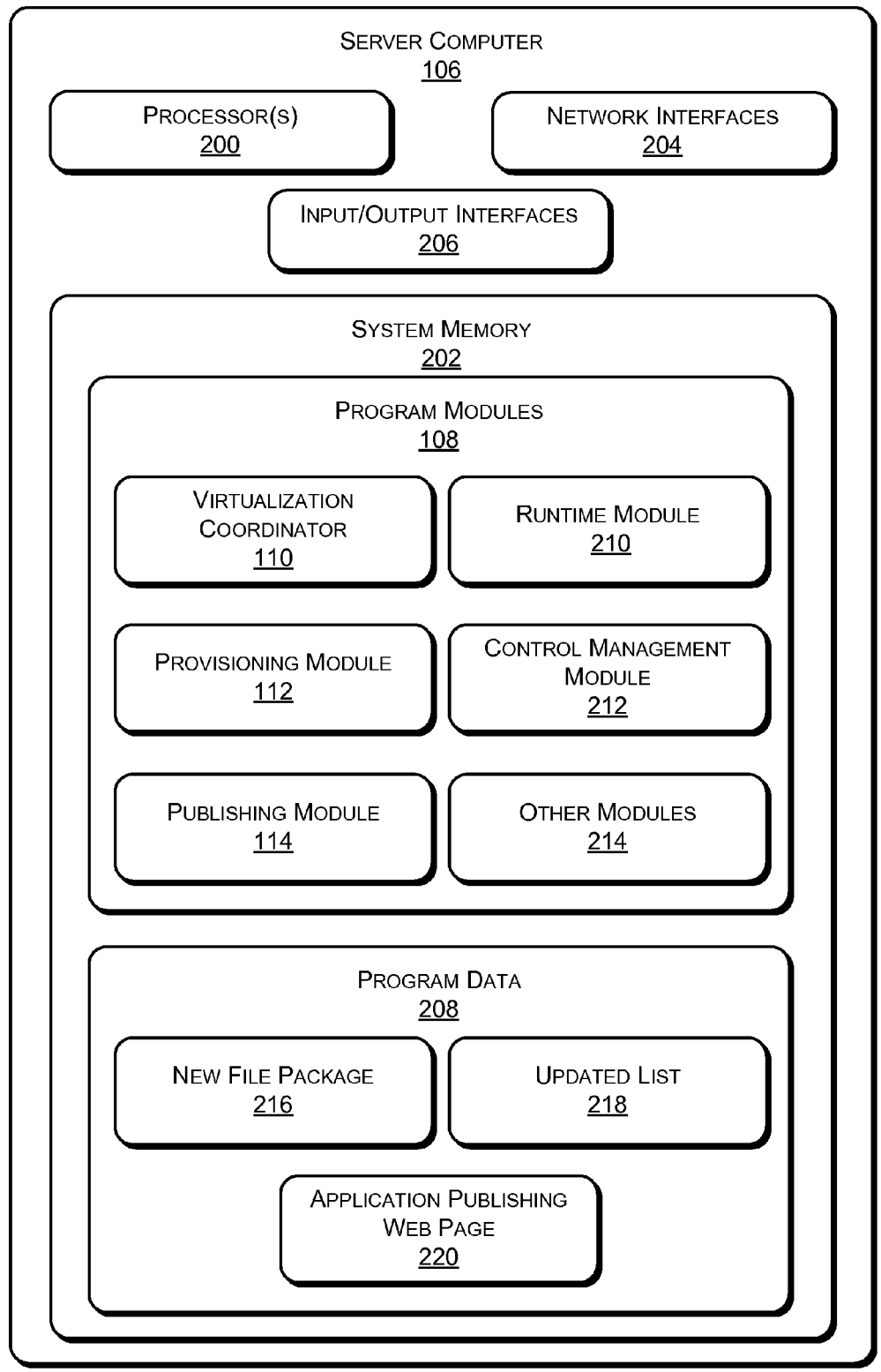
FIG. 2 is a block diagram illustrates a server computer for implementing remote auto provisioning and publication of applications.

FIG. 2 shows an exemplary architecture and functional components of server computer 106 for implementing remote auto provisioning and publication of applications. The server 106 includes processor(s) 200, system memory 202, network interfaces 204, and I/O interfaces 206. The network interfaces 204 provides connectivity to a wide variety of networks, such as network 102, and others such as wired networks (e.g., LAN, cable, etc.) and wireless networks (e.g., WLAN, cellular, satellite, etc.). The input/output interfaces 206 provide data input and output capabilities for the server computer 106. The input/output interfaces 206 may include, for example, a mouse port, a keyboard port, etc.

The system memory 202 stores the program modules 108 and program data 208. Program modules 108 include, for example, the virtualization coordinator 110, the provisioning module 112, the publishing module 114, a runtime module 210, a control management module 212, and other modules 214 (e.g., an Operating System or OS for providing a runtime environment, networked communications between multiple users, etc.).

The virtualization coordinator 110 can provide several functions, including acting as a central unit to a remote computing (e.g., Terminal Services™) environment; performing file package identification by monitoring the predefined location; and initiating the process of automatic provisioning and publication of the applications to the users.

As noted earlier, the virtualization coordinator 110 may be employed for identifying the presence of collection of files related to the application in a predefined location. The virtualization coordinator 110 may instruct the runtime module 210 to collect the collection of files and store them in the server computer 106 as a new file package 216. The virtualization coordinator 110 triggers the provisioning module 112 to provision the application locally to the users through the client devices 104.

In an implementation, the virtualization coordinator 110 may instruct the provisioning module 112 to collect the new file package 216 and provision the application to the client devices 104. For example, the provisioning module 112 (i.e., a Microsoft® SoftGrid™ client) may be instructed by the virtualization coordinator 110 to copy the new file package 216 and install the application in the server 106. In such a case, the new file package 216 can be a Microsoft® SoftGrid™ package. In such cases, provisioning module 112 can employ a Microsoft® SoftGrid™ application runtime environment to provision the application. It is to be noted that Microsoft® SoftGrid™ application runtime environment allows applications to be deployed in real-time to client devices 104 from the server computer 106.

Once the application may be made available to the users, the virtualization coordinator 110 instructs the publishing module 114 to publish the application so as to be accessed by the users, such as client devices 104. As discussed above, prior to instructing the publishing module 114 to publish the application, the virtualization coordinator 110 can construct the data necessary to generate a request for publication of application.

The control management module 212 controls the operation of the virtualization coordinator 110. For example, the control management module 212 can start or stop the execution of the virtualization coordinator 110 based on requests received from the system administrator. The interaction between the control management module 212 and the virtualization coordinator 110 is further described in detail below in reference to FIG. 3.

In an implementation, during the publication process the publishing module 114 may update a preexisting list of applications accessible to the users with the newly available applications to generate an updated list 218. Based on the updated list 218, the publishing module 114 generates an application publishing web page 220 presentable to the users through the client devices 104.

In an implementation, the publishing module 114 can publish the application publishing web page 220, by appending the preexisting list of applications with the updated list 218. In another implementation, the application publishing web page 220 may be a previously existing web page that may be updated with the application. Therefore, the server computer 106 upon request from the user may display the application publishing web page 220.

Exemplary Workflow Diagram

Figure 3:
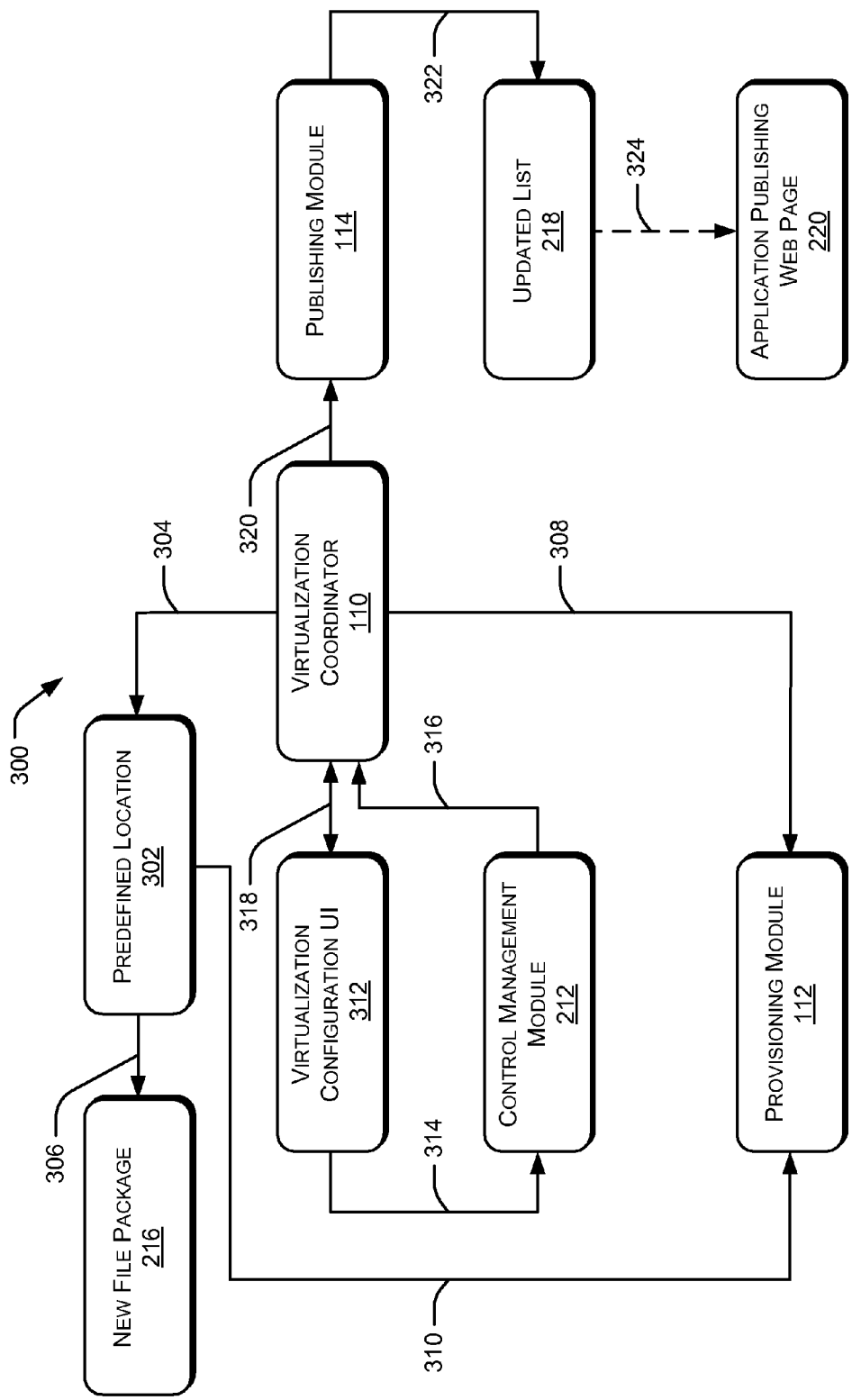
FIG. 3 is flow diagram illustrating an exemplary workflow for remote auto provisioning and publication of applications.

FIG. 3 illustrates an exemplary workflow diagram 300 for auto provisioning and publication of applications. The workflow 300 shows a stepwise flow of a process from storing of the collection of files at a predefined location to a stage where the application is published and made available to the users.

The workflow 300 shows the virtualization coordinator 110 that continuously monitors a predefined location 302 to identify arrival of any files that may be indicative of the presence of files associated with a new application (process 304). The files may be copied into the predefined location 302 by the system administrator. In an implementation, the virtualization coordinator 110 may be configured to collect and copy files associated with the application to be installed and save it in server computer 106 as new file package 216 (i.e., process 306). In another instance, new file package 216 may be a persistent storage memory that may be included in the server computer 106.

The virtualization coordinator 110 can instruct the provisioning module 112 to provision or install the application for local use in the server 106 based on the files stored in the new file package 216 (i.e., process 308). In an implementation, during the process 308, the virtualization coordinator 110 may instruct the provisioning module 112 to collect files associated with the application to be installed from the predefined location 302. Upon receipt of such an instruction, the provisioning module 112 collects files of the application to be installed from the predefined location 302 (i.e., process 310).

The system administrator can configure the control management module 212 to initiate or terminate the operation of the virtualization coordinator 110 through a virtualization configuration user interface (UI) 312 (i.e., processes 314 and 316). In an implementation, the virtualization coordinator 110 may operate based on the instructions received from the system administrator directly through the virtualization configuration UI 312 as shown by process 318.

A process 320 shows the instructions given by the virtualization coordinator 110 to the publishing module 114 to publish the application to a web page, and made available to the remote users. The publishing module 114 then adds the application into the updated list 218 during a process 322. It is to be noted that the updated list 218 may be a preexisting list of application that may be continuously updated with new applications. In one implementation, the updated list 218 may be used to validate any application request generated by the user through the client devices 104. The updated list 218 may be displayed through the application publishing web page 220 to the user during an interaction 324.

Exemplary Methods

Exemplary processes for remote auto provisioning and publication of applications are described with reference to FIGS. 1-3. The processes may be described in the general context of computer executable instructions. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

Figure 4:
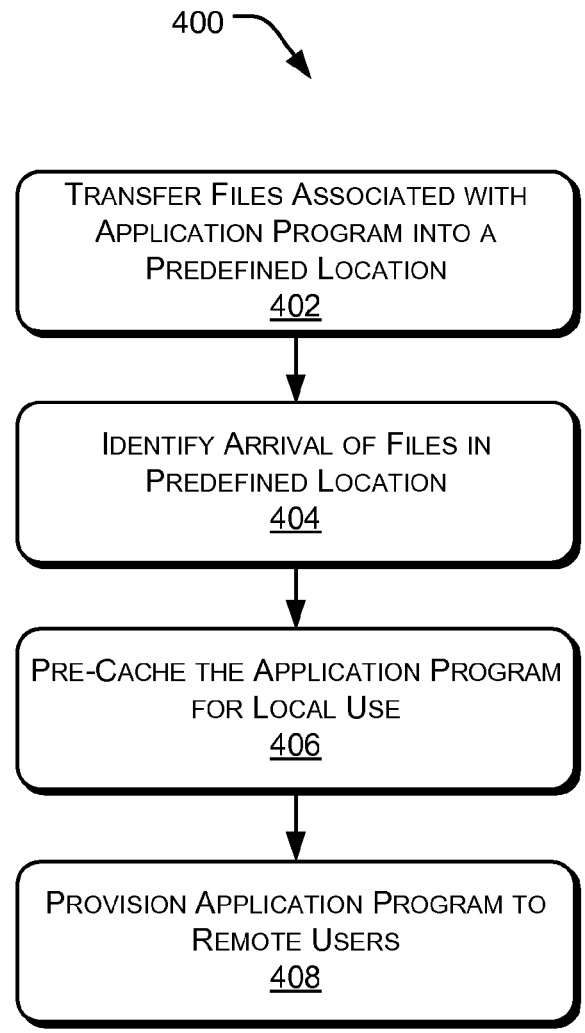
FIG. 4 is a flowchart illustrating an exemplary process for implementing remote auto provisioning of applications.

FIG. 4 illustrates an exemplary method 400 for remote auto provisioning of applications. Process 400 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations.

The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof, without departing from the scope of the invention.

At block 402, files associated with application that is to be installed are transferred into a predefined location. For example, a system administrator collects the collection of files associated with an application from an external source connected to the server computer 106 and copies the collection of files to the predefined location 302.

At block 404, arrival of the files associated with application in the predefined location is identified. For example, the virtualization coordinator 110 may monitor the predefined location 302 periodically to determine whether collection of files related to applications to be installed on the server computer 106 are present. The control management module 212 may send instructions based on inputs received from the system administrator through the virtualization configuration UI 312. The inputs may be for example, instructions to control the operation of the virtualization coordinator 110.

At block 406, the application is be pre-cached for local use. The virtualization coordinator 110 may gather the collection of files associated with the application from the predefined location 302 and store the collection of files as the new file package 216 in the server computer 106. In an implementation, the virtualization coordinator 110 may instruct the provisioning module 112 to collect the new file package 216 for local use.

At block 408, the application is provisioned for remote client device. The virtualization coordinator 110 may instruct the provisioning module 112 to install the application so that the application is available for users, such as client devices 104. In one implementation, the provisioning module 112 may be also configured to set the rights of each user and policies associated with the accessibility of the application based on the inputs received from the system administrator.

For example, the virtualization coordinator 110 may communicate to the provisioning module 112, that the application may be accessible to a set of users. Such communications may be provided by the system administrator through the virtualization configuration UI 312 to the virtualization coordinator 110. Once such rights and policies are set by the provisioning module 112, the application may be ready for access by users.

Figure 5:
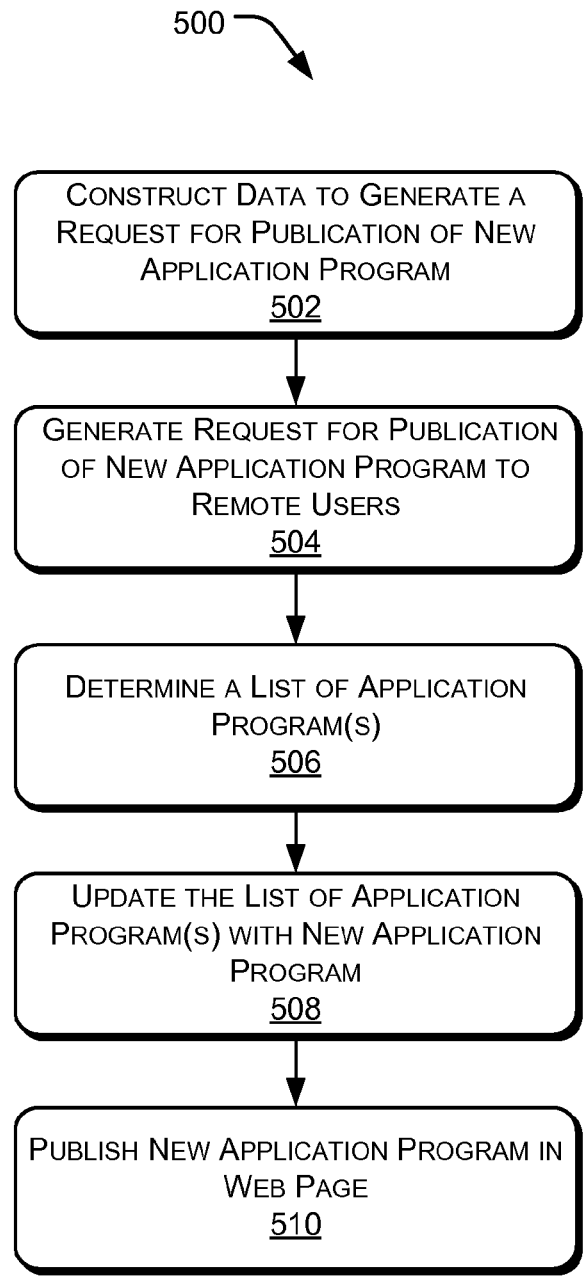
FIG. 5 is a flowchart illustrating an exemplary process for implementing remote auto publication of applications.

FIG. 5 illustrates an exemplary method 500 for remote auto publication of applications. At block 502, data necessary for generating a request for publication of new application is constructed. The virtualization coordinator 110 may generate the data for the publication of the new application on a web page made available to the users, such as client devices 104, for access. As mentioned previously, the data may include for example, application name, application path, application icon, and RDP files. For example, when an application icon is published, a user may access the application by selecting the application icon.

At block 504, a request for publication of the new application to remote users is generated. For example, the virtualization coordinator 110 may collect the data required for publication and instruct the publishing module 114 to publish the new application based on the collected data. Additionally, the virtualization coordinator 110 may transfer the data to the publishing module 114 so as to provide the supporting details for publication of the new application.

At block 506, a list of applications to be published is determined. For example, the publishing module 114 may identify the applications presently accessed by the users. Based on these applications, the publishing module 114 may generate the list of applications, such as on a web page. In an implementation, the publishing module 114 may identify a list of applications that previously existed on the server computer 106 and publish details of the new applications as an appended list.

At block 508, the list of applications is updated with the new application. For example, the publishing module 114 may include the new application in the list of applications to generate an updated list 218 of applications.

At block 510, the new application is published in a web page. The publishing module 114 publishes the application along with the applications present in the updated list in the web page. The web page may be accessed by the user to use the new application.

An Exemplary Computer Environment

Figure 6:
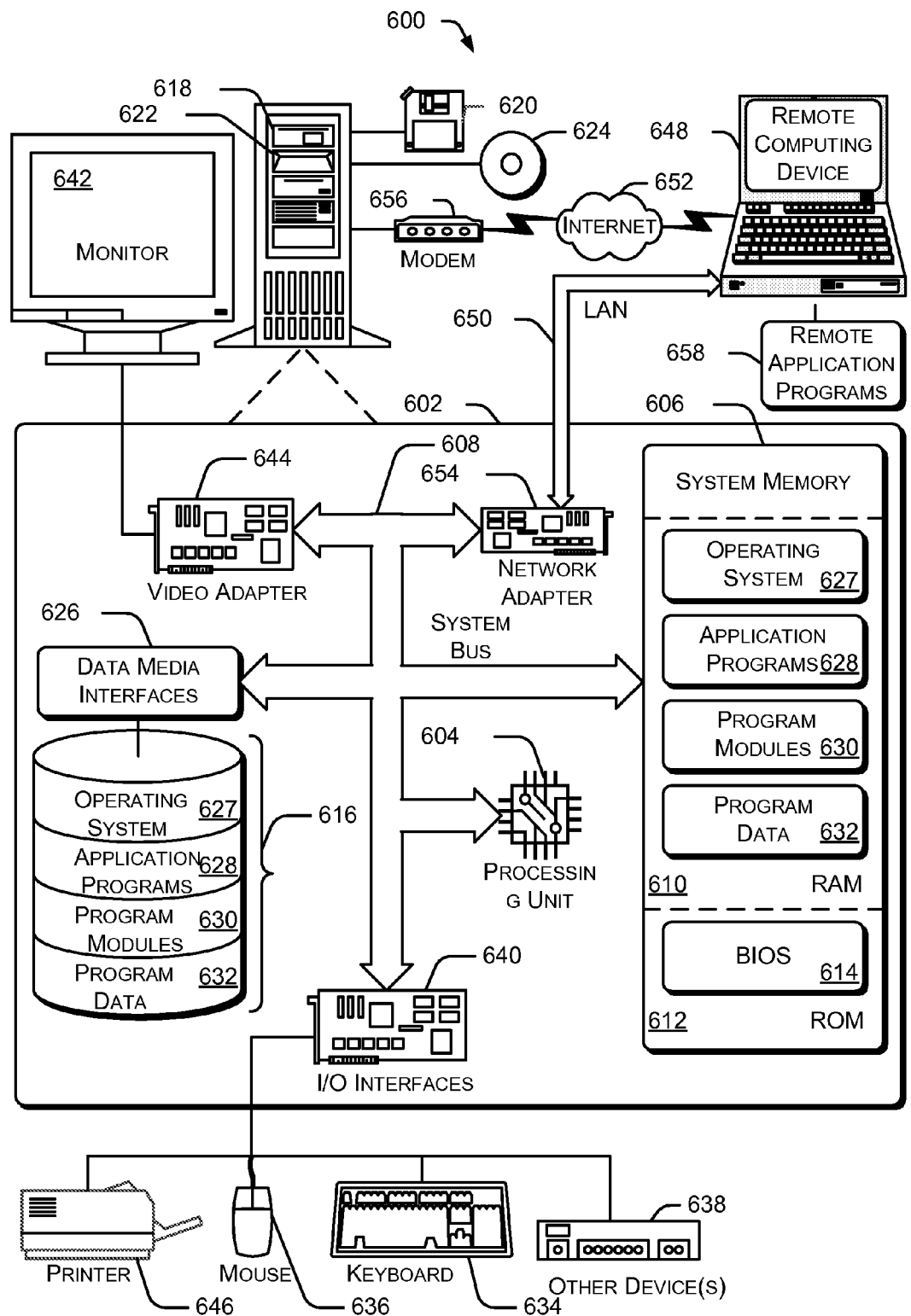
FIG. 6 is a block diagram illustrating an exemplary computing environment.

FIG. 6 illustrates an exemplary general computer environment 600, which can be used to implement the techniques described herein, and which may be representative, in whole or in part, of elements described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing-based device in the form of a computer 602. Computer 602 can be, for example, a desktop computer, a handheld computer, a notebook or laptop computer, a server computer, a game console, and so on. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612 is illustrated. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown). furthermore FIG. 6 illustrates a magnetic disk drive 618 for reading from and writing to a removable, non-volatile magnetic disk 620 (e.g., a "floppy disk"), additionally FIG. 6 illustrates an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternately, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more applications 628, other program modules 630, and program data 632. Each of such operating system 626, one or more applications 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646, which can be connected to computer 602 via the input/output interfaces 640.

Computer 602 can operate in a networked environment using logical connections to one or more remote computers, such as a remote computing-based device 648. By way of example, the remote computing-based device 648 can be a personal computer, portable computer, a server, a router, a network computer, a peer device or other common network node, and the like. The remote computing-based device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote applications 658 reside on a memory device of remote computer 648. For purposes of illustration, applications and other executable program components such as the operating system are illustrated herein as discrete blocks, although it is recognized that such programs and components reside at various times in different storage components of the computing-based device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for implementing remote auto provisioning and publication of applications have been described in language specific to structural features and/or methods, it is to be understood that the subject of the appended claims is not necessarily limited to the specific features or methods described. Rather, the specific features and methods are disclosed as exemplary implementations for providing remote auto provisioning and publication of applications.

What is claimed is:

1. A server computer comprising:
    one or more processors;
    a memory coupled to the one or more processors;
    a predefined location in the memory configured to receive a collection of files related to an application that is to be installed in the server computer and to be published and provisioned to remote client devices other than the server computer;
    a virtualization coordinator stored in the memory and executable by the one or more processors to monitor the predefined location to identify a presence of a collection of files related to the application in the predefined location, and provide an instruction to collect the collection of files related to the application from the predefined location and install the application on the server computer in response to identifying a presence of the collection of files related to the application in the predefined location; and
    a provisioning module stored in the memory and executable by the one or more processors to collect the collection of files from the predefined location, install the application on the server in response to receiving the instruction from the virtualization coordinator and pre-cache the application for local use by remote users.

2. The server computer of claim 1, wherein the virtualization coordinator is further configured to identify a location of the collection of files.

3. The server computer of claim 1, wherein the virtualization coordinator initiates provisioning and publication of the application to the remote client devices of the remote users.

4. The server computer of claim 1, wherein the provisioning module installs the collection of files for use by the remote users.

5. The server computer of claim 1 further comprising a publishing module that publishes the application to cause the application available for one or more users.

6. The server computer of claim 5, wherein the publishing module adds the application to a list of other applications available to the one or more users.

7. The server computer of claim 1 further comprising a runtime module that is instructed by the virtualization coordinator to collect the collection of files and store the collection of files in the server computer as a new file package.

8. The server computer of claim 1 further comprising a control management module that controls operation of the virtualization coordinator.

9. A method comprising:
    under control of one or more processors configured with executable instructions:
    identifying a presence of a collection of files related to an application in a predefined location that is associated with a remote host, the predefined location being configured to receive a collection of files related to an application that is to be installed in the remote host;
    constructing data to generate a request for publication of the application;
    generating to remote users, the request for publication based on the data;
    pre-caching the application for local use by the remote users;

determining a pre-existing list of applications that are available to the remote users;

updating the pre-existing list of applications with the application; and publishing the updated list of applications.

10. The method of claim 9, wherein the data includes data from application name, application path, application icon, and/or RDP files.

11. The method of claim 9, wherein the generating includes collecting the data for publishing and publishing the application based on the data.

12. The method of claim 9, wherein the determining includes identifying one or more applications that previously existed and appending any new applications to the pre-existing list.

13. The method of claim 9, wherein the publishing comprises publishing the updated of applications to a web page.

14. The method of claim 13, wherein the users access the web page to use the applications of the updated list.

15. One or more computer storage media configured with computer-executable instructions that, when executed by one or more processors, configure the one or more processors to perform acts comprising:

identifying a presence of a collection of files related to an application in a predefined location that is associated with a remote host, the predefined location being configured to receive a collection of files related to an application that is to be installed in the remote host;

constructing data to generate a request for publication of the application;

generating to remote users, the request for publication based on the data;

pre-caching the application for local use by the remote users;

determining a pre-existing list of applications that are available to the remote users;

updating the pre-existing list of applications with the application; and publishing the updated list of applications.

16. The one or more computer storage media of claim 15, wherein the data includes data from application name, application path, application icon, and/or RDP files.

17. The one or more computer storage media of claim 15, wherein the generating includes collecting the data for publishing and publishing the application based on the data.

18. The one or more computer storage media of claim 15, wherein the determining includes identifying one or more applications that previously existed and appending any new applications to the pre-existing list.

19. The one or more computer storage media of claim 15, wherein the publishing comprises publishing the updated list of applications to a web page.

20. The one or more computer storage media of claim 19, wherein the users access the web page to use the applications of the updated list.

* * * * *

UNITED STATES PATENT AND TRADEMARK OFFICE
CERTIFICATE OF CORRECTION

| | | |
|---|---|---|
| PATENT NO. | : 8,196,137 B2 | |
| APPLICATION NO. | : 11/872428 | |
| DATED | : June 5, 2012 | |
| INVENTOR(S) | : Baker, III et al. | |

It is certified that error appears in the above-identified patent and that said Letters Patent is hereby corrected as shown below:

In the Claims:

In column 11, line 17, in Claim 13, after "updated" insert -- list --.

Signed and Sealed this
Twenty-fifth Day of December, 2012

David J. Kappos
*Director of the United States Patent and Trademark Office*